United States Patent
Lai

(10) Patent No.: US 6,442,893 B1
(45) Date of Patent: Sep. 3, 2002

(54) BEAN SPROUT CULTURE BOX WITH A SPRINKLING DEVICE

(76) Inventor: Wen-Chi Lai, No. 1, Lane 197, Tzu Chiang S. St., Feng Yuan City, Taichung Hsien (TW)

( * ) Notice: Subject to any disclaimer, the term of this patent is extended or adjusted under 35 U.S.C. 154(b) by 0 days.

(21) Appl. No.: 09/710,853

(22) Filed: Nov. 14, 2000

(51) Int. Cl.⁷ .............................................. A01G 31/02
(52) U.S. Cl. .............................. 47/62 R; 47/14; 47/61; 47/79
(58) Field of Search ............................ 47/62 R, 59, 60, 47/79, 48.5, 39, 58.1, 14, 61

(56) References Cited

U.S. PATENT DOCUMENTS

| | | | | |
|---|---|---|---|---|
| 4,042,150 A | * | 8/1977 | Roos | 222/650 |
| 4,144,671 A | * | 3/1979 | Lee | 47/61 |
| 4,157,770 A | * | 6/1979 | Roos | 222/650 |
| 4,419,842 A | * | 12/1983 | Paloian | 47/62 |
| 4,676,023 A | * | 6/1987 | Mori | 47/82 |
| 5,025,589 A | * | 6/1991 | Park | 47/61 |
| 5,415,347 A | * | 5/1995 | Negroni | 239/65 |
| 5,671,562 A | * | 9/1997 | Fah | 47/79 |
| 5,983,562 A | * | 11/1999 | Lai | 47/61 |

* cited by examiner

*Primary Examiner*—Charles T. Jordan
*Assistant Examiner*—Tara M Golba
(74) *Attorney, Agent, or Firm*—Rosenberg, Klein & Lee

(57) ABSTRACT

A bean sprout culture box with a sprinkling device has a water tray, at least one culture case, a sprinkling case, a hollow sprinkler pivotally mounted in the sprinkling case and an inlet valve. The sprinkling case has multiple drain holes defined in the bottom of the sprinkling case. The hollow sprinkler has a chamber defined in the bottom of the sprinkler and multiple posts extending down from the sprinkler at the end opposite from the chamber. With such a bean sprout culture box, the sprinkling device can automatically sprinkle by the effect of gravity on the water, and electricity is not needed.

5 Claims, 6 Drawing Sheets

BEAN SPROUT CULTURE BOX WITH A SPRINKLING DEVICE

BACKGROUND OF THE INVENTION

1. Field of the Invention

The present invention relates to a bean sprout culture box, and more particularly to a bean sprout culture box with an automatic sprinkling device.

2. Description of Related Art

With reference to FIG. 6, a traditional bean sprout culture box in accordance with the prior art comprises a culture case (80) and a net tray (82). The net tray (82) is mounted in the culture case (80) to hold the beans. Several posts (not numbered) extend down from the bottom of the net tray (82), such that the net tray (82) is supported above the bottom of the culture case (80) and a water reservoir is defined between the net tray (82) and the culture case (80). Because the conventional culture case (80) cannot sprinkle automatically, a watering can (90) is used to sprinkle water on the bean sprouts.

However, manually sprinkling with the conventional watering can (90) is inconvenient. Water is not evenly sprinkled over the net tray (82). As a result, a conventional culture box is provided with an electrical sprinkling device to solve the foregoing problems. However, the operation of the conventional electrical sprinkling device requires electricity. The conventional sprinkling device cannot operate when electricity cannot be supplied. Therefore, the use of the conventional electrical sprinkling device is also inconvenient. Furthermore, a control device to control the operation of the sprinkling device is needed. This will increase the cost of procuring and using the sprinkling device.

To overcome the shortcomings, the present invention tends to provide an improved bean sprout culture box with a sprinkling device to mitigate or obviate the aforementioned problems.

SUMMARY OF THE INVENTION

The main objective of the invention is to provide an improved bean sprout culture box with a sprinkling device to automatically sprinkle with no electricity required. The bean sprout culture box has a water tray, at least one culture case, a sprinkling case, a hollow sprinkler pivotally mounted in the sprinkling case and an inlet valve. The sprinkling case has multiple drain holes defined in the bottom of the sprinkling case. The hollow sprinkler has a chamber defined in the bottom of the sprinkler and multiple posts extending down from the sprinkler at the end away from the chamber. This can sprinkle automatically, and electricity is not needed.

Other objects, advantages and novel features of the invention will become more apparent from the following detailed description when taken in conjunction with the accompanying drawings.

DETAILED DESCRIPTION OF PREFERRED EMBODIMENT

Figure 1:
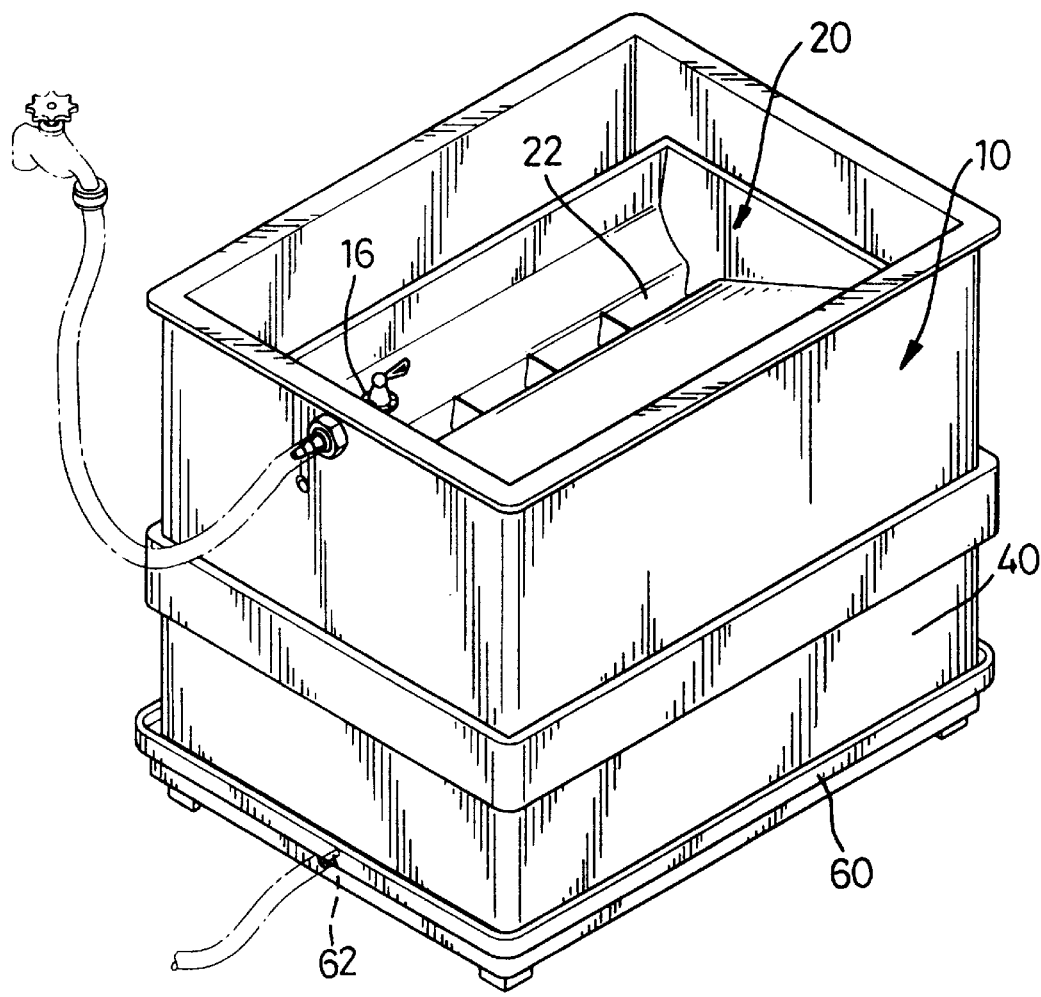
FIG. 1 is a perspective view of a bean sprout culture box in accordance with the present invention.
Figure 2:
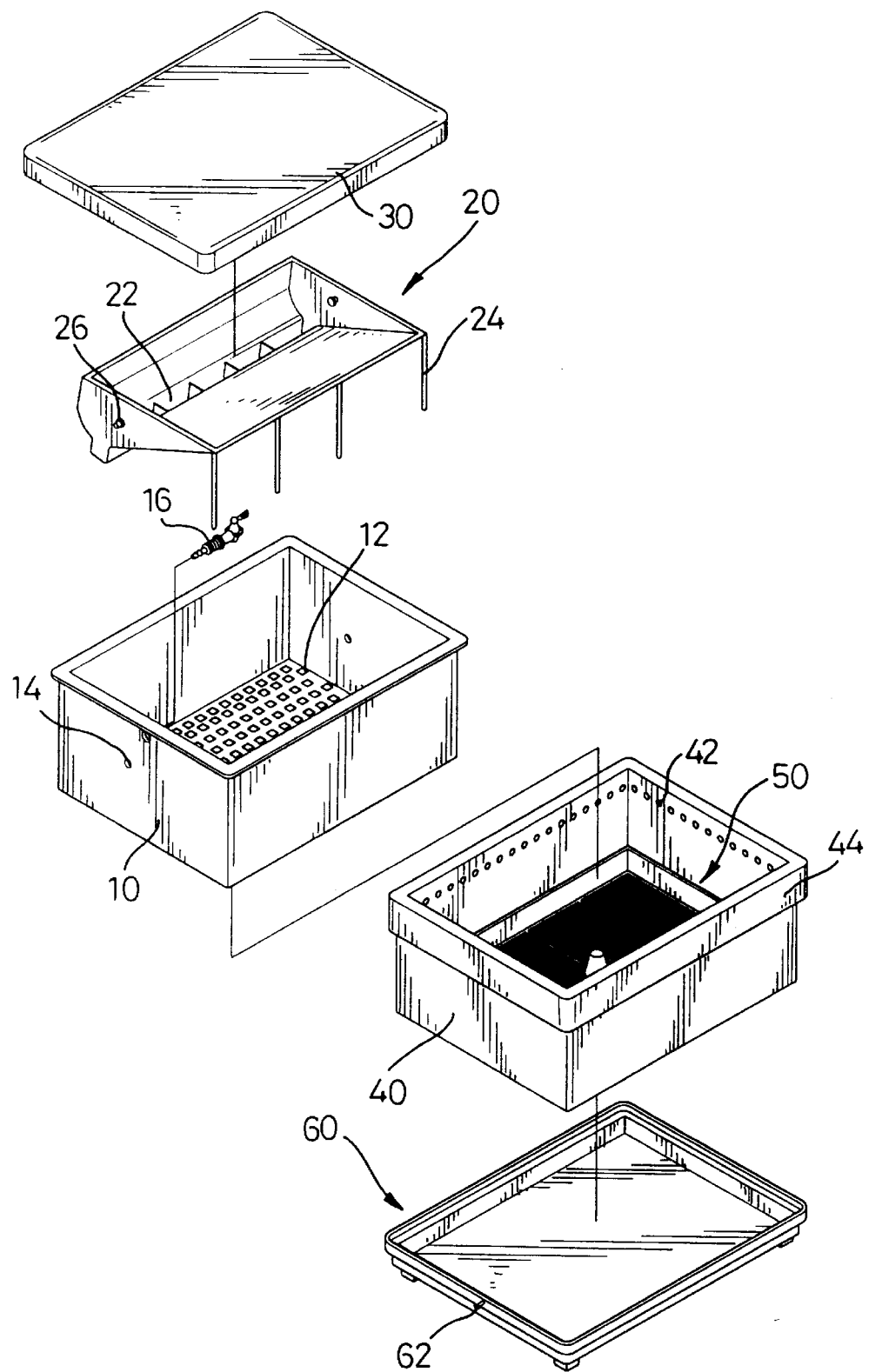
FIG. 2 is an exploded perspective view of the bean sprout culture box in FIG. 1.
Figure 5:
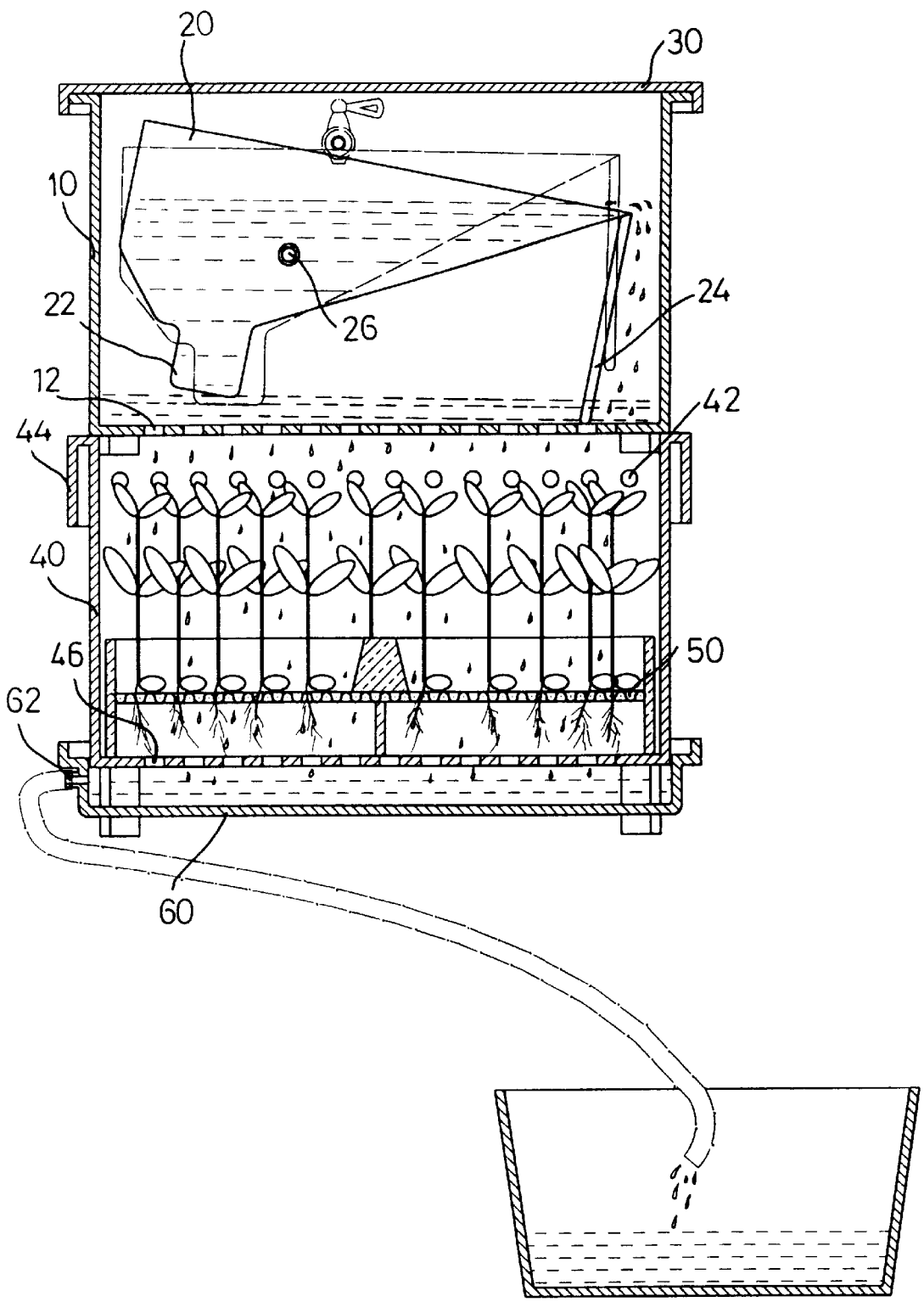
FIG. 5 is an operational side plan view in partial section of the bean sprout culture box in FIG. 1.
Figure 6:
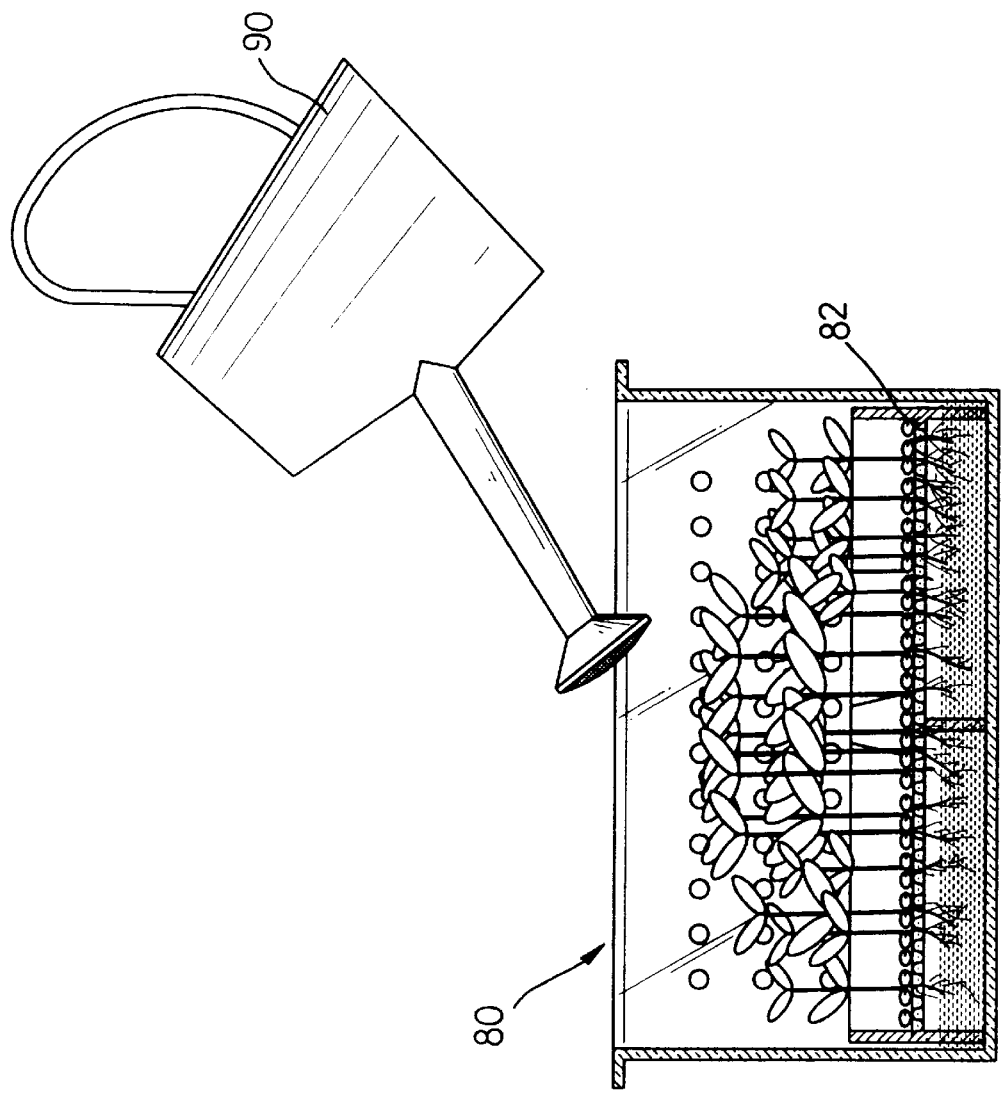
FIG. 6 is an operational front plan view in partial section of a bean sprout culture box in accordance with the prior art.

With reference to FIGS. 1 and 2, a bean sprout culture box in accordance with the present invention comprises a water tray (60), a culture case (40), a sprinkling case (10), a sprinkler (20) and an inlet valve (16). The water tray (60) has an overflow port (62) defined in one wall of the tray (60). With reference to FIG. 1 and 5, a hose is connected to the overflow port (62) and discharges in separate a reservoir.

The culture case (40) is supported on the water tray (60). In practice, multiple stacked culture cases (40) are supported on a single tray (60). Each culture case (40) has multiple drain holes (46) defined in the bottom to communicate with the water tray (60). A net plate (50) is mounted in each culture case (40) to hold the beans. A skirt (44) extends down from the top outside edge of each culture case (40). Multiple vents (42) are defined in each culture case (40) and correspond to the skirt (44) for the air to pass through the vents (42).

The sprinkling case (10) is supported on the culture case (40). When there are multiple culture cases (40) mounted on the water tray (60), the sprinkling case (10) is located on the topmost culture case (40). The sprinkling case (10) has multiple drain holes (12) defined in the bottom to communicate with the culture case (40) below. A hood (30) is mounted on and covers the sprinkling case (10).

The sprinkler (20) is a container with an open top. A chamber (22) is defined in the bottom of the sprinkler (20) at one end of the sprinkler (20). Multiple posts (24) extend down from the sprinkler (20) at the end opposite from the chamber (22). A pivot pin (26) protrudes from the outside of each side of the sprinkler (20). A bore (14) is defined in each opposite side of the sprinkling case (10) to engage with the corresponding pivot pin (26) ill the sprinkler (20). The sprinkler (20) is pivotally mounted in the sprinkling case (10) by means of the engagement between the pivot pins (26) and the corresponding bores (14).

Figure 3:
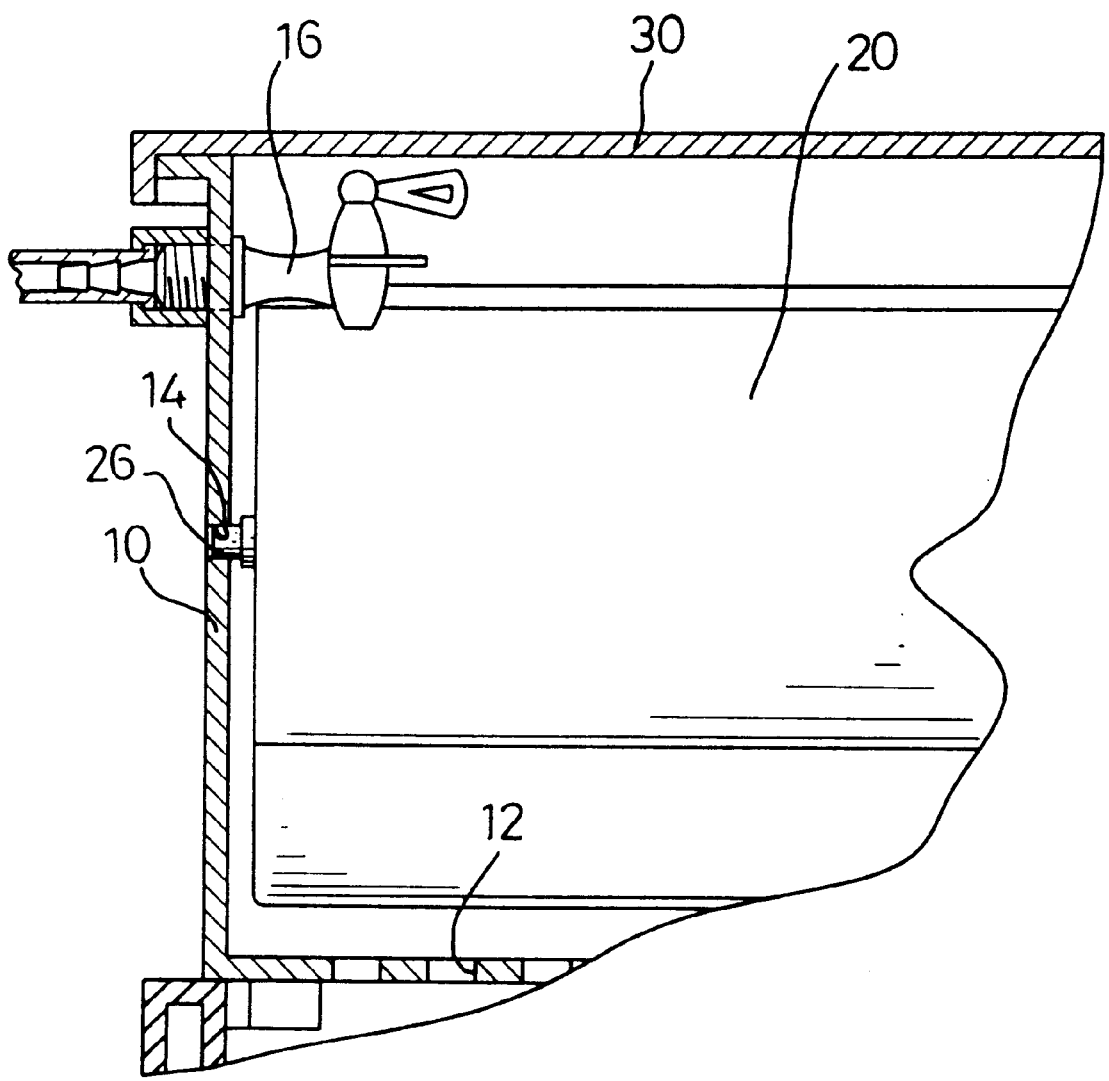
FIG. 3 is a partial side plan view in partial section of the bean sprout culture box in FIG. 1.

With reference to FIGS. 1 to 3, the inlet valve (16) extends into the sprinkling case (10) above the sprinklet (20). The inlet valve (16) is connected to a faucet (not numbered) with a hose (not numbered), such that the sprinkler (20) can be filled with water from the tap through the hose and the inlet valve (16).

Figure 4:
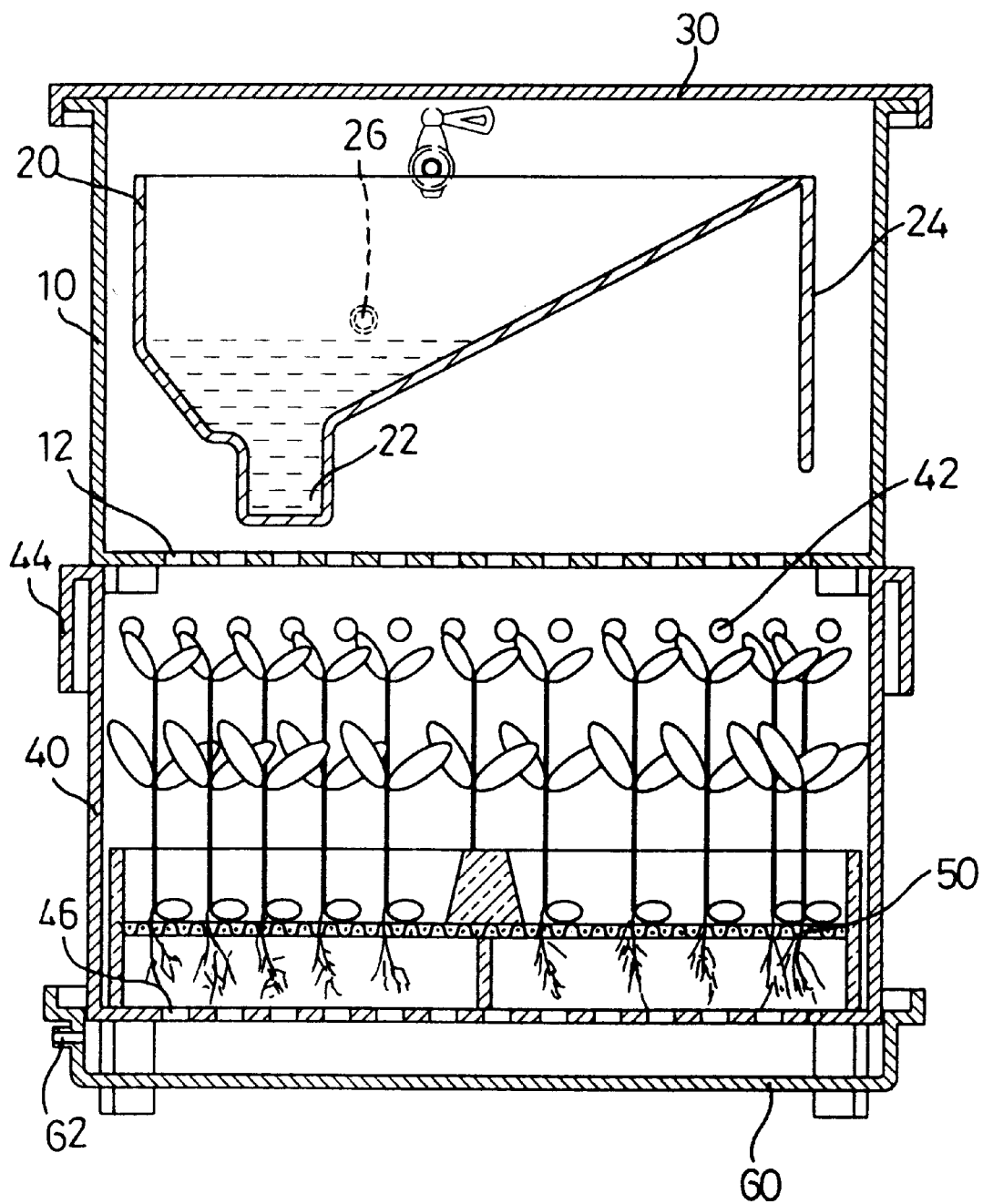
FIG. 4 is a side plan view in partial section of the bean sprout culture box in FIG. 1.

In operation, with reference to FIGS. 1, 4 and 5, some water is received in the chamber (22) of the sprinkler (20) in advance. The end of the sprinkler (20) with the posts (24) will rotate up due to the weight of the water in the chamber (22). The water will not flow out of the sprinkler (20). When the user turns on the tap, the water will be sent into the sprinkler (20) from the tap through the inlet valve (16). After a desired amount of the water is added to the sprinkler (20), the weight of the water in the chamber (22) will be overcome. The sprinkler (20) will rotate relative to the sprinkling case (10) due to the weight of the added water. The water will be sprinkled out from the sprinkler (20). When the water is poured out of the sprinkler (20) by means of the rotation of the sprinkler (20), the water will strike the wall of the sprinkling case (10) and flow over the whole sprinkling case (10). The water will evenly pass through all of the drain holes (12) in the sprinkling case (10) and be sprinkled into the culture case (40) below. This can provide an even sprinkling effect to all of the beans held on the net plate (50). The water tray (60) is used to hold the water that flows through the culture case (40). The excess water in the water tray (60) will be automatically sent to a reservoir through a hose connected to the overflow port (62).

When the water is sprinkled from the sprinkler (20), the posts (24) will abut the bottom of the sprinkling case (10). The rotating angle of the sprinkler (20) can be controlled, and the amount of water of each sprinkling is controlled.

In addition, because the rotating angle is controlled by the abutment between each post and the bottom of the sprinkling case (10), all the water in the sprinkler (20) will not be poured out. The chamber (22) will still hold an amount of water in the chamber (22), so the sprinkler (20) will rotate backward due to the weight of the water in the chamber (22). Consequently, the sprinkler (20) will automatically sprinkle by the effect of gravity on the water. No electric power is needed to active the sprinkling device. The cost for using the bean sprout culture box can be reduced. Furthermore, because the flow of the water can be controlled at the tap, the time between two subsequent sprinklings is also controlled.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bean sprout culture box comprising:

a water tray with an overflow port;

at least one culture case supported on the water tray;

a sprinkling case supported on a topmost culture case and having multiple drain holes defined in a bottom of the sprinkling case;

a hollow sprinkler having opposing first and second ends being pivotally mounted in the sprinkling case for rotative displacement about a pivotal axis and having an open cavity for receiving water therein, a predetermined volume of water received in the cavity causing the rotative displacement of the sprinkler from a filling position to a dispensing position wherein a portion of the received water is dispensed to the sprinkling case from the first end of the sprinkler, the cavity having an open chamber defined in a bottom thereof adjacent the second end of the sprinkler and having a predetermined volume of water maintained therein, the water maintained in the chamber acting as a counterweight to return the sprinkler to the filling position subsequent to a predetermined volume of water being dispensed from the sprinkler, the sprinkler having multiple posts extending down from the first end of the sprinkler for limiting the rotative displacement of the sprinkler to the dispensing position; and an inlet valve extending into the sprinkling case above the sprinkler.

2. The bean sprout culture box as claimed in claim 1, wherein a skirt extends down from a top outside edge of each of at least one culture case; and multiple vents are defined in each at least one culture case and correspond to the skirt to provide a ventilation effect to the culture case.

3. The bean sprout culture box as claimed in claim 1, wherein a pivot pin protrudes from each side of the sprinkler; and a bore is defined in each side of the sprinkling case to engage with the corresponding pivot pin in the sprinkler.

4. The bean sprout culture box as claimed in claim 1 further comprising a net plate mounted in each of the at least one culture case.

5. The bean sprout culture box as claimed in claim 1 further comprising a hood mounted on the sprinkling case to cover the sprinkling case.

* * * * *